United States Patent
Finn et al.

(10) Patent No.: US 10,914,191 B2
(45) Date of Patent: Feb. 9, 2021

(54) SYSTEM AND METHOD FOR IN SITU AIRFOIL INSPECTION

(71) Applicant: United Technologies Corporation, Farmington, CT (US)

(72) Inventors: Alan Matthew Finn, Hebron, CT (US); Zaffir A. Chaudhry, South Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 304 days.

(21) Appl. No.: 15/971,236

(22) Filed: May 4, 2018

(65) Prior Publication Data

US 2019/0338666 A1 Nov. 7, 2019

(51) Int. Cl.
| | |
|---|---|
| G06K 9/00 | (2006.01) |
| F01D 21/00 | (2006.01) |
| G06T 1/00 | (2006.01) |
| G06T 3/40 | (2006.01) |
| G06T 7/00 | (2017.01) |

(52) U.S. Cl.
CPC .......... *F01D 21/003* (2013.01); *G06T 1/0014* (2013.01); *G06T 3/4038* (2013.01); *G06T 7/001* (2013.01); *F05D 2260/80* (2013.01); *F05D 2270/8041* (2013.01); *G06T 2207/10028* (2013.01); *G06T 2207/30164* (2013.01)

(58) Field of Classification Search
CPC ... F01D 21/003; G06T 1/0014; G06T 3/4038; G06T 7/001; G06T 2207/30164; G06T 2207/10028; F05D 2260/80; F05D 2270/8041; F05D 2220/32; F05D 2220/36
USPC .................................................. 382/141, 152
See application file for complete search history.

(56) References Cited

U.S. PATENT DOCUMENTS

| | | |
|---|---|---|
| 3,804,397 A | 4/1974 | Neumann |
| 4,402,053 A | 8/1983 | Kelley et al. |
| 4,403,294 A | 9/1983 | Hamada et al. |
| 4,873,651 A | 10/1989 | Raviv |
| 5,064,291 A | 11/1991 | Reiser |
| 5,119,678 A | 6/1992 | Bashyam et al. |
| 5,345,514 A | 9/1994 | Mahdavieh et al. |
| 5,345,515 A | 9/1994 | Nishi et al. |
| 5,351,078 A | 9/1994 | Lemelson |
| 5,963,328 A | 10/1999 | Yoshida et al. |

(Continued)

FOREIGN PATENT DOCUMENTS

| | | |
|---|---|---|
| CA | 2820732 A1 | 12/2014 |
| DE | 19710743 A1 | 9/1998 |

(Continued)

OTHER PUBLICATIONS

U.S. Non-Final Office Action dated Mar. 5, 2019 for corresponding U.S. Appl. No. 15/971,227.
U.S. Non-Final Office Action dated Mar. 12, 2020 for corresponding U.S. Appl. No. 15/971,194.
Gao et al., 'A Statistical Method for Crack Detection from Vibrothermography Inspection Data',(2010) Statistics Preprints. Paper 68. http://lib.dr.iastate.edu/stat_las_preprints/68.

(Continued)

*Primary Examiner* — Andrew M Moyer
(74) *Attorney, Agent, or Firm* — Bachman & LaPointe, P.C.

(57) ABSTRACT

An optical in-situ system for a gas turbine engine blade inspection comprises a camera configured to capture images of a forward surface of at least one gas turbine engine blade; and a processor coupled to the camera, the processor configured to determine damage to the at least one gas turbine engine blade based on image analytics.

19 Claims, 4 Drawing Sheets

(56) References Cited

U.S. PATENT DOCUMENTS

| | | |
|---|---|---|
| 6,023,637 A | 2/2000 | Liu et al. |
| 6,153,889 A | 11/2000 | Jones |
| 6,177,682 B1 | 1/2001 | Bartulovic et al. |
| 6,271,520 B1 | 8/2001 | Tao et al. |
| 6,399,948 B1 | 6/2002 | Thomas |
| 6,434,267 B1 | 8/2002 | Smith |
| 6,462,813 B1 | 10/2002 | Haven et al. |
| 6,690,016 B1 | 2/2004 | Watkins et al. |
| 6,737,648 B2 | 5/2004 | Fedder et al. |
| 6,759,659 B2 | 7/2004 | Thomas et al. |
| 6,804,622 B2 | 10/2004 | Bunker et al. |
| 6,907,358 B2 | 6/2005 | Suh et al. |
| 6,965,120 B1 | 10/2005 | Beyerer et al. |
| 7,026,811 B2 | 4/2006 | Roney, Jr. et al. |
| 7,064,330 B2 | 6/2006 | Raulerson et al. |
| 7,119,338 B2 | 10/2006 | Thompson et al. |
| 7,122,801 B2 | 10/2006 | Favro et al. |
| 7,129,492 B2 | 10/2006 | Saito et al. |
| 7,164,146 B2 | 1/2007 | Weir et al. |
| 7,190,162 B2 | 3/2007 | Tenley et al. |
| 7,220,966 B2 | 5/2007 | Saito et al. |
| 7,233,867 B2 | 6/2007 | Pisupati et al. |
| 7,240,556 B2 | 7/2007 | Georgeson et al. |
| 7,272,529 B2 | 9/2007 | Hogan et al. |
| 7,313,961 B2 | 1/2008 | Tenley et al. |
| 7,415,882 B2 | 8/2008 | Fetzer et al. |
| 7,446,886 B2 | 11/2008 | Aufmuth et al. |
| 7,489,811 B2 | 2/2009 | Brummel et al. |
| 7,602,963 B2 | 10/2009 | Nightingale et al. |
| 7,689,030 B2 | 3/2010 | Suh et al. |
| 7,724,925 B2 | 5/2010 | Shepard |
| 7,738,725 B2 | 6/2010 | Raskar et al. |
| 7,823,451 B2 | 11/2010 | Sarr |
| 7,966,883 B2 | 6/2011 | Lorraine et al. |
| 8,050,491 B2 | 11/2011 | Vaidyanathan |
| 8,204,294 B2 | 6/2012 | Alloo et al. |
| 8,208,711 B2 | 6/2012 | Venkatachalam et al. |
| 8,221,825 B2 | 7/2012 | Reitz et al. |
| 8,239,424 B2 | 8/2012 | Haigh et al. |
| 8,431,917 B2 | 4/2013 | Wang et al. |
| 8,449,176 B2 | 5/2013 | Shepard |
| 8,520,931 B2 | 8/2013 | Tateno |
| 8,528,317 B2 | 9/2013 | Gerez et al. |
| 8,692,887 B2 | 4/2014 | Ringermacher et al. |
| 8,744,166 B2 | 6/2014 | Scheid et al. |
| 8,761,490 B2 | 6/2014 | Scheid et al. |
| 8,781,209 B2 | 7/2014 | Scheid et al. |
| 8,781,210 B2 | 7/2014 | Scheid et al. |
| 8,792,705 B2 | 7/2014 | Scheid et al. |
| 8,913,825 B2 | 12/2014 | Taguchi et al. |
| 8,983,794 B1 | 3/2015 | Motzer et al. |
| 9,037,381 B2 | 5/2015 | Care |
| 9,046,497 B2 | 6/2015 | Kush et al. |
| 9,066,028 B1 | 6/2015 | Koshti |
| 9,080,453 B2 | 7/2015 | Shepard et al. |
| 9,116,071 B2 | 8/2015 | Hatcher, Jr. et al. |
| 9,134,280 B2 | 9/2015 | Cataldo et al. |
| 9,146,205 B2 | 9/2015 | Renshaw et al. |
| 9,151,698 B2 | 10/2015 | Jahnke et al. |
| 9,154,743 B2 | 10/2015 | Hatcher, Jr. et al. |
| 9,240,049 B2 | 1/2016 | Ciurea et al. |
| 9,251,582 B2 | 2/2016 | Lim et al. |
| 9,300,865 B2 | 3/2016 | Wang et al. |
| 9,305,345 B2 | 4/2016 | Lim et al. |
| 9,458,735 B1 | 10/2016 | Diwinsky et al. |
| 9,465,385 B2 | 10/2016 | Kamioka et al. |
| 9,467,628 B2 | 10/2016 | Geng et al. |
| 9,471,057 B2 | 10/2016 | Scheid et al. |
| 9,476,798 B2 | 10/2016 | Pandey et al. |
| 9,476,842 B2 | 10/2016 | Drescher et al. |
| 9,483,820 B2 | 11/2016 | Lim et al. |
| 9,488,592 B1 | 11/2016 | Maresca et al. |
| 9,519,844 B1 | 12/2016 | Thompson et al. |
| 9,594,059 B1 | 3/2017 | Brady et al. |
| 9,734,568 B2 | 5/2017 | Vajaria et al. |
| 9,785,919 B2 | 10/2017 | Diwinsky et al. |
| 9,804,997 B2 | 10/2017 | Sharp et al. |
| 9,808,933 B2 | 11/2017 | Lin et al. |
| 9,981,382 B1 | 5/2018 | Strauss et al. |
| 10,438,036 B1 | 10/2019 | Reome et al. |
| 2002/0121602 A1 | 9/2002 | Thomas et al. |
| 2002/0167660 A1 | 11/2002 | Zaslavsky |
| 2003/0117395 A1 | 6/2003 | Yoon |
| 2003/0205671 A1 | 11/2003 | Thomas et al. |
| 2004/0089811 A1 | 5/2004 | Lewis et al. |
| 2004/0089812 A1 | 5/2004 | Favro et al. |
| 2004/0139805 A1 | 7/2004 | Antonelli et al. |
| 2004/0201672 A1 | 10/2004 | Varadarajan et al. |
| 2004/0240600 A1 | 12/2004 | Freyer et al. |
| 2004/0245469 A1 | 12/2004 | Favro et al. |
| 2004/0247170 A1 | 12/2004 | Furze et al. |
| 2005/0008215 A1 | 1/2005 | Shepard |
| 2005/0113060 A1 | 5/2005 | Lowery |
| 2005/0151083 A1 | 7/2005 | Favro et al. |
| 2005/0167596 A1 | 8/2005 | Rothenfusser et al. |
| 2005/0276907 A1 | 12/2005 | Harris et al. |
| 2006/0012790 A1 | 1/2006 | Furze et al. |
| 2006/0078193 A1 | 4/2006 | Brummel et al. |
| 2006/0086912 A1 | 4/2006 | Weir et al. |
| 2007/0007733 A1 | 1/2007 | Hogarth et al. |
| 2007/0017297 A1 | 1/2007 | Georgeson et al. |
| 2007/0045544 A1 | 3/2007 | Favro et al. |
| 2008/0022775 A1 | 1/2008 | Sathish et al. |
| 2008/0053234 A1 | 3/2008 | Staroselsky et al. |
| 2008/0111074 A1 | 5/2008 | Weir et al. |
| 2008/0183402 A1 | 7/2008 | Malkin et al. |
| 2008/0229834 A1 | 9/2008 | Bossi et al. |
| 2008/0247635 A1 | 10/2008 | Davis et al. |
| 2008/0247636 A1 | 10/2008 | Davis et al. |
| 2009/0000382 A1 | 1/2009 | Sathish et al. |
| 2009/0010507 A1 | 1/2009 | Geng |
| 2009/0066939 A1 | 3/2009 | Venkatachalam et al. |
| 2009/0128643 A1 | 5/2009 | Kondo et al. |
| 2009/0252987 A1 | 10/2009 | Greene, Jr. |
| 2009/0279772 A1 | 11/2009 | Sun et al. |
| 2009/0312956 A1 | 12/2009 | Zombo et al. |
| 2010/0212430 A1 | 8/2010 | Murai et al. |
| 2010/0220910 A1 | 9/2010 | Kaucic et al. |
| 2011/0062339 A1 | 3/2011 | Ruhge et al. |
| 2011/0083705 A1* | 4/2011 | Stone .................. B08B 3/02 134/109 |
| 2011/0119020 A1 | 5/2011 | Key |
| 2011/0123093 A1 | 5/2011 | Alloo et al. |
| 2011/0299752 A1 | 12/2011 | Sun |
| 2011/0302694 A1 | 12/2011 | Wang et al. |
| 2012/0154599 A1 | 6/2012 | Huang |
| 2012/0188380 A1 | 7/2012 | Drescher et al. |
| 2012/0249959 A1 | 10/2012 | You et al. |
| 2012/0275667 A1 | 11/2012 | Lu |
| 2012/0293647 A1 | 11/2012 | Singh et al. |
| 2013/0028478 A1 | 1/2013 | St-Pierre et al. |
| 2013/0041614 A1 | 2/2013 | Shepard et al. |
| 2013/0070897 A1 | 3/2013 | Jacotin |
| 2013/0113914 A1 | 5/2013 | Scheid et al. |
| 2013/0113916 A1 | 5/2013 | Scheid et al. |
| 2013/0163849 A1 | 6/2013 | Jahnke et al. |
| 2013/0235897 A1 | 9/2013 | Bouteyre et al. |
| 2013/0250067 A1 | 9/2013 | Laxhuber et al. |
| 2014/0022357 A1 | 1/2014 | Yu et al. |
| 2014/0056507 A1 | 2/2014 | Doyle et al. |
| 2014/0098836 A1 | 4/2014 | Bird |
| 2014/0184786 A1 | 7/2014 | Georgeson et al. |
| 2014/0185912 A1* | 7/2014 | Lim .................. G06T 7/33 382/141 |
| 2014/0198185 A1 | 7/2014 | Haugen et al. |
| 2014/0200832 A1 | 7/2014 | Troy et al. |
| 2014/0350338 A1 | 11/2014 | Tanaka et al. |
| 2015/0041654 A1 | 2/2015 | Barychev et al. |
| 2015/0046098 A1 | 2/2015 | Jack et al. |
| 2015/0086083 A1 | 3/2015 | Chaudhry et al. |
| 2015/0128709 A1 | 5/2015 | Stewart et al. |
| 2015/0138342 A1 | 5/2015 | Brdar et al. |
| 2015/0185128 A1 | 7/2015 | Chang et al. |
| 2015/0233714 A1 | 8/2015 | Kim |

(56) References Cited

U.S. PATENT DOCUMENTS

| | | | |
|---|---|---|---|
| 2015/0253266 | A1 | 9/2015 | Lucon et al. |
| 2015/0314901 | A1 | 11/2015 | Murray et al. |
| 2016/0012588 | A1 | 1/2016 | Taguchi et al. |
| 2016/0043008 | A1 | 2/2016 | Murray et al. |
| 2016/0109283 | A1 | 4/2016 | Broussais-Colella et al. |
| 2016/0178532 | A1 | 6/2016 | Lim et al. |
| 2016/0241793 | A1 | 8/2016 | Ravirala et al. |
| 2016/0284098 | A1 | 9/2016 | Okumura et al. |
| 2016/0314571 | A1 | 10/2016 | Finn et al. |
| 2016/0328835 | A1 | 11/2016 | Maresca, Jr. et al. |
| 2016/0334284 | A1 | 11/2016 | Kaplun Mucharrafille et al. |
| 2017/0011503 | A1 | 1/2017 | Newman |
| 2017/0023505 | A1 | 1/2017 | Maione et al. |
| 2017/0052152 | A1 | 2/2017 | Tat et al. |
| 2017/0085760 | A1 | 3/2017 | Ernst et al. |
| 2017/0090458 | A1 | 3/2017 | Lim et al. |
| 2017/0122123 | A1 | 5/2017 | Kell et al. |
| 2017/0142302 | A1* | 5/2017 | Shaw ................... H04N 5/2252 |
| 2017/0184469 | A1 | 6/2017 | Chang et al. |
| 2017/0184549 | A1 | 6/2017 | Reed et al. |
| 2017/0184650 | A1 | 6/2017 | Chang et al. |
| 2017/0211408 | A1 | 7/2017 | Ahmadian et al. |
| 2017/0219815 | A1* | 8/2017 | Letter ................. H04N 5/23238 |
| 2017/0221274 | A1 | 8/2017 | Chen et al. |
| 2017/0234837 | A1 | 8/2017 | Hall et al. |
| 2017/0241286 | A1* | 8/2017 | Roberts ................... F01D 17/02 |
| 2017/0258391 | A1 | 9/2017 | Finn et al. |
| 2017/0262965 | A1 | 9/2017 | Xiong et al. |
| 2017/0262977 | A1 | 9/2017 | Finn et al. |
| 2017/0262979 | A1 | 9/2017 | Xiong et al. |
| 2017/0262985 | A1 | 9/2017 | Finn et al. |
| 2017/0262986 | A1 | 9/2017 | Xiong et al. |
| 2017/0270651 | A1 | 9/2017 | Bailey et al. |
| 2017/0284971 | A1 | 10/2017 | Hall |
| 2017/0297095 | A1 | 10/2017 | Zalameda et al. |
| 2018/0002039 | A1 | 1/2018 | Finn et al. |
| 2018/0005362 | A1 | 1/2018 | Wang et al. |
| 2018/0013959 | A1 | 1/2018 | Slavens et al. |
| 2018/0019097 | A1 | 1/2018 | Harada et al. |
| 2018/0098000 | A1 | 4/2018 | Park et al. |
| 2018/0111239 | A1 | 4/2018 | Zak et al. |
| 2019/0299542 | A1 | 10/2019 | Webb |
| 2019/0339131 | A1 | 11/2019 | Finn et al. |
| 2019/0339165 | A1 | 11/2019 | Finn et al. |
| 2019/0339206 | A1 | 11/2019 | Xiong et al. |
| 2019/0339207 | A1 | 11/2019 | Finn et al. |
| 2019/0339234 | A1 | 11/2019 | Finn et al. |
| 2019/0339235 | A1 | 11/2019 | Finn et al. |
| 2019/0340721 | A1 | 11/2019 | Finn et al. |
| 2019/0340742 | A1 | 11/2019 | Finn et al. |
| 2019/0340805 | A1 | 11/2019 | Xiong et al. |
| 2019/0342499 | A1 | 11/2019 | Xiong et al. |

FOREIGN PATENT DOCUMENTS

| | | |
|---|---|---|
| EP | 1961919 A2 | 8/2008 |
| GB | 2545271 A | 6/2017 |
| JP | 06235700 A | 8/1994 |
| JP | 2015161247 A | 9/2015 |
| SG | 191452 A1 | 7/2013 |
| WO | 2013088709 A1 | 6/2013 |
| WO | 2016112018 A1 | 7/2016 |
| WO | 2016123508 A1 | 8/2016 |
| WO | 2016176524 A1 | 11/2016 |

OTHER PUBLICATIONS

Li1 Ming; Holland1 Stephen D.; and Meeker1 William Q.1 "Statistical Methods for Automatic Crack Detection Based on Vibrothermography Sequence-of-Images Data" (2010). Statistics Preprints. 69.

Henneke et al. 'Detection of Damage in Composite Materials by Vibrothermography', ASTM special technical publication (696), American Society for Testing and Materials, 1979, pp. 83-95.

http://www.npl.co.uk/commercial-services/sector-case-studies/thermal-imaging-reveals-the-invisible; Apr. 17, 2012.

Tian et al., 'A Statistical Framework for Improved Automatic Flaw Detection in Nondestructive Evaluation Images', Technometrics, 59, 247-261. Feb. 1, 2017.

Emmanuel J. Cand'ES1,2, Xiaodong LI2, Yi MA3,4, and John Wright4, "Robust Principal Component Analysis", (1)Department of Statistics, Stanford University, Stanford, CA; (2)Department of Mathematics, Stanford University, Stanford, CA; (3, 4) Electrical and Computer Engineering, UIUC, Urbana, IL (4) Microsoft Research Asia, Beijing, China, Dec. 17, 2009.

Sebastien Parent; "From Human to Machine: How to Be Prepared for Integration of Automated Visual Inspection" Quality Magazine, https://www.qualitymag.com/articles/91976. Jul. 2, 2014.

http://www.yxlon.com/products/x-ray-and-ct-inspection-systems/yxlon-mu56-tb, 2016.

U.S. Office action dated Jul. 23, 2018 issued in corresponding U.S. Appl. No. 15/971,254.

U.S. Non-Final Office Action dated Nov. 26, 2019 for corresponding U.S. Appl. No. 15/971,194.

U.S. Non-Final Office Action dated May 28, 2019 for corresponding U.S. Appl. No. 15/971,214.

U.S. Non-Final Office Action dated Feb. 25, 2020 for corresponding U.S. Appl. No. 15/971,214.

E. J. Candès, X. Li, Y. Ma, and J. Wright, "Robust Principal Component Analysis", submitted. http://www-stat.stanford.edu/~candes/papers/RobustPCA.pdf.

M. Sznaier, O. Camps, N. Ozay, T. Ding, G. Tadmor and D. Brooks, "The Role of Dynamics in Extracting Information Sparsely Encoded in High Dimensional Data Streams", in Dynamics of Information Systems, Hirsch, M.J.; Pardalos, P.M.; Murphey, R. (Eds.), pp. 1-28, Springer Verlag, 2010.

M. Fazel, H. Hindi, and S. Boyd, "A Rank Minimization Heuristic with Application to Minimum Order System Approximation", American Control Conference, Arlington, Virginia, pp. 4734-4739, Jun. 2001.

Meola et al., 'An Excursus on Infrared Thermography Imaging', J. Imaging 2016, 2, 36 http://www.mdpi.com/2313-433X/2/4/36/pdf.

Yu et al., 'ASIFT: An Algorithm for Fully Affine Invariant Comparison', Image Processing on Line on Feb. 24, 2011. http://www.ipol.im/pub/art/2011/my-asift/article.pdf.

Schemmel et al., 'Measurement of Direct Strain Optic Coefficient of YSZ Thermal Barrier Coatings at Ghz Frequencies', Optics Express, v.25, n.17, Aug. 21, 2017, https://doi.org/10.1364/OE.25.019968.

Jean-Yves Bouguet, "Camera Calibration Toolbox for Matlab", http://www.vision.caltech.edu/bouguetj/calib_doc/, accessed on Nov. 10, 2017.

https://www.qualitymag.com/articles/91976-from-human-to-machine-how-to-be-prepared-for-integration-of-automated-visual-inspection.

http://www.yxlon.com/products/x-ray-and-ct-inspection-systems/yxlon-mu56-tb.

Yu et al. 'Shadow Graphs and 3D Texture Reconstruction', IJCV, vol. 62, No. 1-2, 2005, pp. 35-60.

U.S. Non-Final Office Action dated Nov. 29, 2019 for corresponding U.S. Appl. No. 15/971,242.

U.S. Final Office Action dated Jan. 3, 2019 for corresponding U.S. Appl. No. 15/971,254.

U.S. Non-Final Office Action dated Apr. 16, 2019 for corresponding U.S. Appl. No. 15/970,985.

Blachnio et al, "Assessment of Technical Condition Demonstrated by Gas Turbine Blades by Processing of Images of Their Surfaces", Journal of KONBiN, 1(21), 2012, pp. 41-50.

Raskar et al., 'A Non-photorealistic Camera: Depth Edge Detection and Stylized Rendering using Multi-flash Imaging' ACM Transactions on Graphics, 2004 http://www.merl.com/publications/docs/TR2006-107.pdf.

Feris et al., 'Specular Reflection Reduction with Multi-Flash Imaging', 17th Brazilian Symposium on Computer Graphics and Image Processing, 2004. http://rogerioferis.com/publications/FerisSIB04.pdf.

(56) References Cited

OTHER PUBLICATIONS

Holland, "First Measurements from a New Broadband Vibrothermography Measurement System", AIP Conference Proceedings, 894 (2007), pp. 478-483. http://link.aip.org/link/doi/10.1063/1.2718010 \.

Gao et al., 'Detecting Cracks in Aircraft Engine Fan Blades Using Vibrothermography Nondestructive Evaluation', RESS Special Issue on Accelerated Testing, 2014, http://dx.doi.org/10.1016/j.ress.2014.05.009.

Gao et al., 'A Statistical Method for Crack Detection from Vibrothermography Inspection Data', Statistics Preprints. Paper 68. http://lib.dr.iastate.edu/stat_las_preprints/68.

Holland, 'Thermographic Signal Reconstruction for Vibrothermography', Infrared Physics & Technology 54 (2011) 503-511.

Li et al., 'Statistical Methods for Automatic Crack Detection Based on Vibrothermography Sequence-of-Images Data', Statistics Preprints. Paper 69. http://lib.dr.iastate.edu/stat_las_preprints/69.

Tian et al., 'A Statistical Framework for Improved Automatic Flaw Detection in Nondestructive Evaluation Images', Technometrics, 59, 247-261.

Henneke et al. 'Detection of Damage in Composite Materials by Vibrothermography', ASTM special technical publication (696), 1979, pp. 83-95.

http://www.npl.co.uk/commercial-services/sector-case-studies/thermal-imaging-reveals-the-invisible.

U.S. Non-Final Office Action dated Apr. 30, 2020 issued for corresponding U.S. Appl. No. 15/970,944.

U.S. Final Office Action dated Jul. 28, 2020 issued for corresponding U.S. Appl. No. 15/971,214.

U.S. Final Office Action dated Aug. 27, 2020 issued for corresponding U.S. Appl. No. 15/970,944.

U.S. Non-Final Office Action dated Aug. 28, 2020 issued for corresponding U.S. Appl. No. 15/971,194.

U.S. Non-Final Office Action dated Jun. 23, 2020 issued for corresponding U.S. Appl. No. 15/971,205.

U.S. Notice of Allowance dated Oct. 19, 2020 issued for corresponding U.S. Appl. No. 15/971,270.

\* cited by examiner

SYSTEM AND METHOD FOR IN SITU AIRFOIL INSPECTION

BACKGROUND

The present disclosure is directed to an automated optical inspection system. Particularly, the disclosure is directed to an automated optical inspection system for fan blades comprising a sensor, a specific simultaneous localization and mapping (SLAM) process (with completeness checking), a model registration process based on fan blade plane determination, mosaicking, and damage detection video analytics.

Gas turbine engine components, such as blades or vanes, may suffer irregularities from manufacturing or wear and damage during operation, for example, due to erosion, hot corrosion (sulfidation), cracks, dents, nicks, gouges, and other damage, such as from foreign object damage. Detecting this damage may be achieved by images, videos, or depth data for aircraft engine blade inspection, power turbine blade inspection, internal inspection of mechanical devices, and the like. A variety of techniques for inspecting by use of images, videos, or 3D sensing may include capturing and displaying images, videos, or depth data to human inspectors for manual defect detection and interpretation. Human inspectors may then decide whether any defect exists within those images, videos, or depth data. When human inspectors look at many similar images, videos, or depth data of very similar blades or vanes of an engine stage or any like components of a device, they may not detect defects, for example, because of fatigue or distraction experienced by the inspector. Missing a defect may lead to customer dissatisfaction, transportation of an expensive engine back to service centers, lost revenue, or even engine failure. Additionally, manual inspection of components may be time consuming and expensive.

SUMMARY

In accordance with the present disclosure, there is provided an in-situ system for a gas turbine engine blade inspection comprising a sensor system configured to capture video images of a forward surface of at least one gas turbine engine blade; and a processor coupled to the sensor system, the processor configured to determine damage to the at least one gas turbine engine blade based on video analytics.

In another and alternative embodiment, the in-situ system for gas turbine engine blade inspection further comprises a tangible, non-transitory memory configured to communicate with the processor, the tangible, non-transitory memory having instructions stored therein that, in response to execution by the processor, cause the processor to perform operations comprising: receiving, by the processor, a data for the forward surface of at least one gas turbine engine blade from the sensor system; aligning, by the processor, the data with a reference model; determining, by the processor, a feature dissimilarity between the data and the reference model; classifying, by the processor, the feature dissimilarity; and determining, by the processor, a probability that the feature dissimilarity indicates damage to the blade.

In another and alternative embodiment, the processor further comprises one or more of a simultaneous localization and mapping process and a structure from motion process program.

In another and alternative embodiment, the processor further comprises a model registration process based on blade plane determination.

In another and alternative embodiment, the processor further comprises a mosaicking program and a damage detection video analytics program.

In another and alternative embodiment, the sensor is integral with at least one of an engine nacelle and an engine washing system.

In another and alternative embodiment, the sensor comprises lighting comprising at least one of a visible spectrum and an infrared spectrum.

In another and alternative embodiment, the sensor comprises a shroud configured to protect the sensor from impact damage and debris.

In another and alternative embodiment, the gas turbine engine blade is selected from the group consisting of a fan blade and a compressor blade.

In another and alternative embodiment, the processor is configured to automatically report damage and archive the damage for trending and condition-based-maintenance.

In accordance with the present disclosure, there is provided a method for in-situ inspection of a gas turbine engine blade, comprising positioning a sensor to capture images of a forward surface of at least one gas turbine engine blade; coupling a processor to the sensor, the processor configured to determine damage to the at least one gas turbine engine blade based on image analytics.

In another and alternative embodiment, the processor performs operations comprising receiving, by the processor, data for the forward surface of at least one gas turbine engine blade from the sensor; aligning, by the processor, the data with a reference model; determining, by the processor, a feature dissimilarity between the data and the reference model; classifying, by the processor, the feature dissimilarity; and determining, by the processor, a probability that the feature dissimilarity indicates damage to the blade.

In another and alternative embodiment, the method for in-situ inspection of a gas turbine engine blade further comprises moving the sensor through location and pose variation to image the forward surface of each of the at least one blade of the gas turbine engine.

In another and alternative embodiment, the method for in-situ inspection of a gas turbine engine blade further comprises mosaicking the forward surface of each of the at least one blade of the gas turbine engine into a 3D current condition estimate.

In another and alternative embodiment, the mosaicking further comprises utilizing a simultaneous localization and mapping process.

In another and alternative embodiment, the method for in-situ inspection of a gas turbine engine blade further comprises estimating a plane of each of the at least one blade of the gas turbine engine based on the data and the reference model; and utilizing rotation as a variable.

In another and alternative embodiment, the method for in-situ inspection of a gas turbine engine blade further comprises archiving the data and the feature dissimilarity for future damage progression detection, damage trending and condition-based maintenance.

In another and alternative embodiment, the method for in-situ inspection of a gas turbine engine blade further comprises imaging the at least one blade of the gas turbine engine one of continuously and intermittently.

In another and alternative embodiment, the imaging is conducted during gas turbine engine operational conditions selected from the group consisting of coasting, spool-up, and spool-down, including at least one complete revolution.

In another and alternative embodiment, the sensor comprises at least one of a video camera and a depth sensor.

In another and alternative embodiment, the sensor is configured to retract away from exposure to debris.

Other details of the automated optical inspection system are set forth in the following detailed description and the accompanying drawings wherein like reference numerals depict like elements.

DETAILED DESCRIPTION

Figure 1:
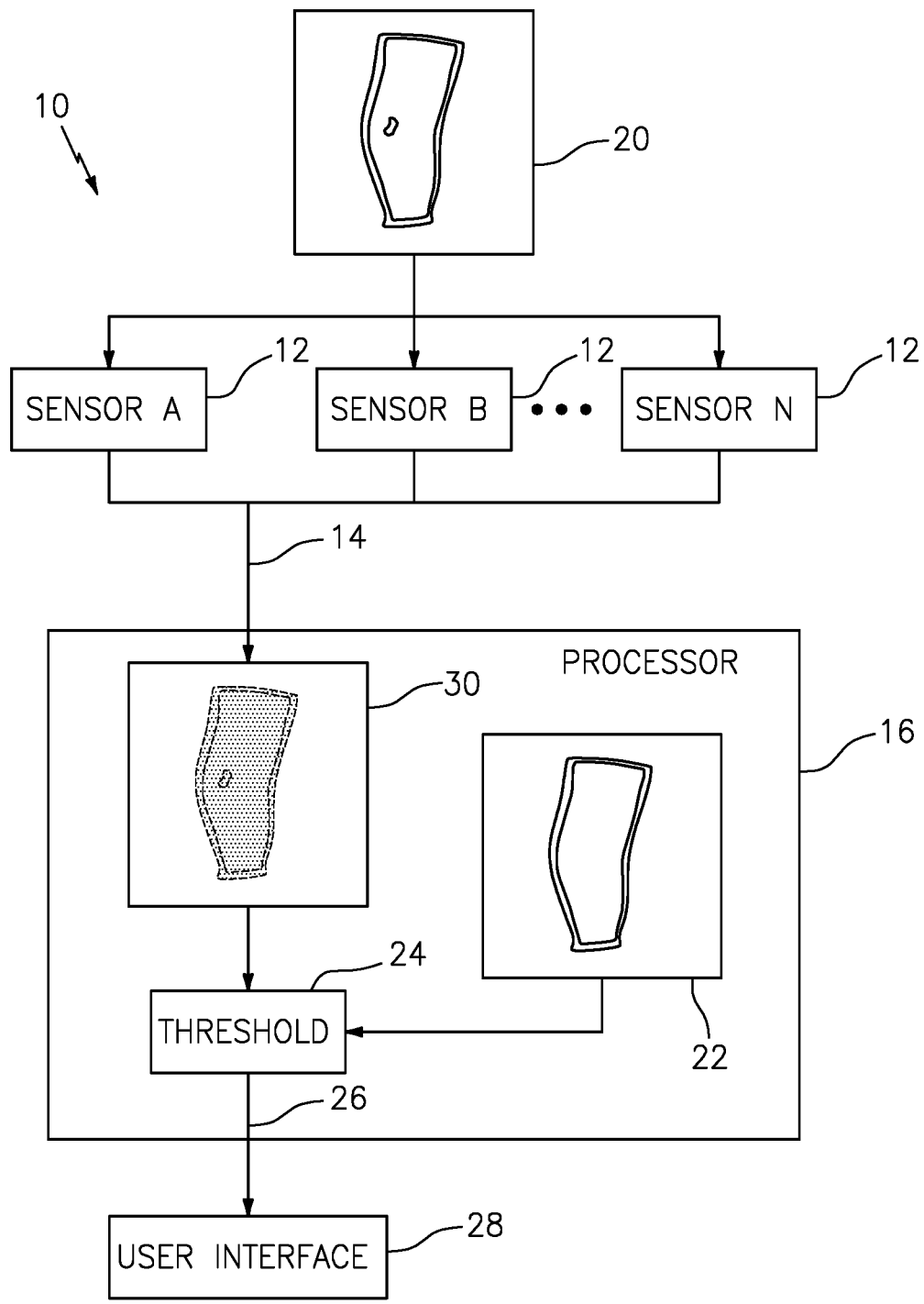
FIG. 1 is a schematic diagram of an exemplary fan blade inspection system in accordance with various embodiments.

Referring to FIG. 1, a schematic illustration of an automated damage detection system 10 for detecting a defect or damage to a component 20 is shown, in accordance with various embodiments. Damage detection system 10 may be configured to perform 3D imaging of a component 20. Component 20 may include a component on an aircraft, such as an engine component, such as a fan blade or an airfoil (e.g., a vane). Component 20 may be scanned or sensed by one or more sensors 12 to obtain data 14 about the component 20. Data 14 may be obtained, for example, from a single 2D sensor, a single 3D sensor, or multiple sensors of multiple types. In various embodiments, data 14 may be obtained by rotating, panning, or positioning the sensor(s) 12 relative to the component 20 to capture data 14 from multiple viewpoint angles, perspectives, and/or depths. Further, the component 20 may be rotated or positioned relative to the sensor(s) 12 to obtain data 14 from multiple viewpoints, perspectives, and/or depths. An array of sensors 12 positioned around component 20 may be used to obtain data 14 from multiple viewpoints. Thus, either of the sensor(s) 12 or component 20 may be moved or positioned relative to the other and relative to various directions or axes of a coordinate system to obtain sensor information from various viewpoints, perspectives, and/or depths. Further, sensor 12 may scan, sense, or capture information from a single position relative to component 20.

A sensor 12 may include a one-dimensional (1D), 2D, 3D sensor (depth sensor) and/or a combination and/or array thereof. Sensor 12 may be operable in the electromagnetic or acoustic spectrum capable of producing a 3D point cloud, occupancy grid or depth map of the corresponding dimension(s). Sensor 12 may provide various characteristics of the sensed electromagnetic or acoustic spectrum including intensity, spectral characteristics, polarization, etc. In various embodiments, sensor 12 may include a distance, range, and/or depth sensing device. Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc. In various embodiments, sensor 12 may be operable to produce depth from defocus, a focal stack of images, or structure from motion.

In an exemplary embodiment, Simultaneous Localization and Mapping (SLAM) constructs a map of an unknown environment (for example, a fan and the space in front of it) while simultaneously keeping track of the camera's location within that environment. SLAM has been used unmanned aerial, ground, and underwater vehicles; planetary rovers; and domestic robots.

In an exemplary embodiment, one or more 2D cameras are employed in a visual SLAM (VSLAM) approach. In an alternative embodiment, various 3D sensors (also called depth sensors) may be employed in place of a 2D camera. In SLAM, probabilistic equations for the camera's (or depth sensor's) location and the fan blades' locations are updated using Bayes' rule and the new images (or depth data). In one embodiment, the SLAM algorithm develops a high-resolution grid map (also called an occupancy grid). The resolution of the grid may be sufficiently small that damage is detectable as presence or absence of physical material in a specific grid. Alternatively, a lower-resolution grid may be employed along with low-order physical modeling of the grid data.

There are multiple methods of computing a low-order model. An occupancy grid has an inherent spatial granularity and minor errors may naturally occur in computing whether or not a specific grid point is occupied by a physical object. To reduce the spatial resolution granularity and any sensing errors, a low-order mathematical model may be fit to the data. For instance, a low-order polynomial may be fit to some or all of the grid data by, for instance, minimizing the sum squared error to compute the polynomial coefficients (this is also known as polynomial regression). In another embodiment, a more complex, but still low-order spline fit may be employed using, for example, an algorithm of Juttler and Felis, "Least-squares fitting of algebraic spline surfaces", as described in Advances in Computational Mathematics, 17:135-152, 2002. In yet another embodiment, a non-linear mathematical model, e.g., including trigonometric functions, exponential functions, step functions, and the like, may be fit to some or all of the data using optimization techniques such as nonlinear regression.

In various embodiments, sensor 12 may include an image capture device, such as an optical device having an optical lens, such as a camera, mobile video camera or other imaging device or image sensor, capable of capturing 2D still images or video images. Sensor 12 may include two or more physically separated cameras that may view a component from different angles, to obtain visual stereo image data.

In various embodiments, sensor 12 may include a structured light sensor, a line sensor, a linear image sensor, or other 1D sensor. Further, sensor 12 may include a 2D sensor, and damage detection system 10 may extract 1D or 2D information from the 2D sensor data. 2D data 14 may be synthesized by processor 16 from multiple 1D data 14 from a 1D sensor 12 or from multiple 1D or 2D data 14 extracted from a 2D sensor 12. The extraction of 1D or 2D data 14 from 2D data 14 may include retaining only data that is in focus. Even further, sensor 12 may include a position and/or orientation sensor such as an inertial measurement unit (IMU) that may provide position and/or orientation information about component 20 with respect to a coordinate system or other sensor 12. The position and/or orientation information may be beneficially employed in synthesizing 2D data from 1D data, or in aligning 1D, 2D or 3D information to a reference model as discussed elsewhere herein.

Notably, there can be qualitative and quantitative differences between 2D imaging sensors, e.g., conventional cameras, and depth sensors to the extent that depth-sensing may provide advantages. In 2D imaging, the reflected color (mixture of wavelengths) from the first object in each radial direction from the imager is captured. The 2D image, then, is the combined spectrum of the source illumination and the spectral reflectivity of objects in the scene. The source illumination may be ambient illumination not specifically associated with or designed for the 2D sensor or the illumination may be specifically designed and installed to provide a good quality 2D image. A 2D image can be interpreted by a person as a picture. In depth-sensing, there is no color (spectral) information; rather, the distance (depth, range) to the first reflective object in a radial direction from the sensor is captured. Depth sensing technologies may have inherent maximum detectable range limits and can be of relatively lower spatial resolution than typical 2D imagers. The use of depth sensing typically can advantageously provide improved operations compared to conventional 2D imaging such as relative immunity to ambient lighting problems and better separation of occluding objects. A 2D image may not be converted into a depth map nor may a depth map be converted into a 2D image. An artificial assignment of contiguous colors or grayscale to contiguous depths may allow a person to crudely interpret a depth map somewhat akin to how a person sees a 2D image, but this assignment does not produce an image in the conventional sense. This inability to convert a depth map into an image might seem a deficiency, but it can be advantageous in certain analytics applications.

The processing algorithms for depth sensing sensors are distinct from the corresponding algorithms for 2D camera images although the algorithms may have the same names to indicate analogous functionality.

Data 14 from sensor(s) 12 may be transmitted to one or more processors 16 (e.g., computer systems having a central processing unit and memory) for recording, processing and storing the data received from sensors 12. Processor 16 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 16 may be in communication (such as electrical communication) with sensors 12 and may be configured to receive input, such as images and/or depth information from sensors 12. Processor 16 may receive data 14 about component 20 captured and transmitted by the sensor(s) 12 via a communication channel. Upon receiving the data 14, the processor 16 may process data 14 from sensors 12 to determine if damage or defects are present on the component 20.

In various embodiments, processor 16 may receive or construct 2D or 3D information 30 corresponding to the component 20. The construction of 3D information from 1D or 2D information may include tiling, mosaicking, stereopsis, structure from motion, structure from multiple viewpoints, simultaneous localization and mapping, and the like. Processor 16 may further include a reference model 22 stored, for example, in memory of processor 16. Reference model 22 may be generated from a CAD model, a 3D CAD model, and/or 3D information, such as from a 3D scan or 3D information of an original component or an undamaged component. Reference model 22 may be a theoretical model or may be based on historical or current information about component 20. In particular, reference model 22 may be derived from the current image data 14. Reference model 22 may be adjusted and updated as component 20 and/or similar components are scanned and inspected. Thus, reference model 22 may be a learned model of a component and may include, for example, 3D information including shape and surface features of the component.

In various embodiments, processor 16 of damage detection system 10 may classify the damage and determine the probability of damage and/or if the damage meets or exceeds a threshold 24. Threshold 24 may be an input parameter, may be based on reference model 22, may be from user input, and the like. Processor 16 may provide an output 26 to a user interface 28 indicating the status of the component 20. User interface 28 may include a display. Damage detection system 10 may display an indication of the damage to component 20, which may include an image and/or a report. In addition to reporting any defects in the component, output 26 may also relay information about the type of defect, the location of the defect, size of the defect, etc. If defects are found in the inspected component 20, an indicator may be displayed on user interface 28 to alert personnel or users of the defect.

Figure 2:
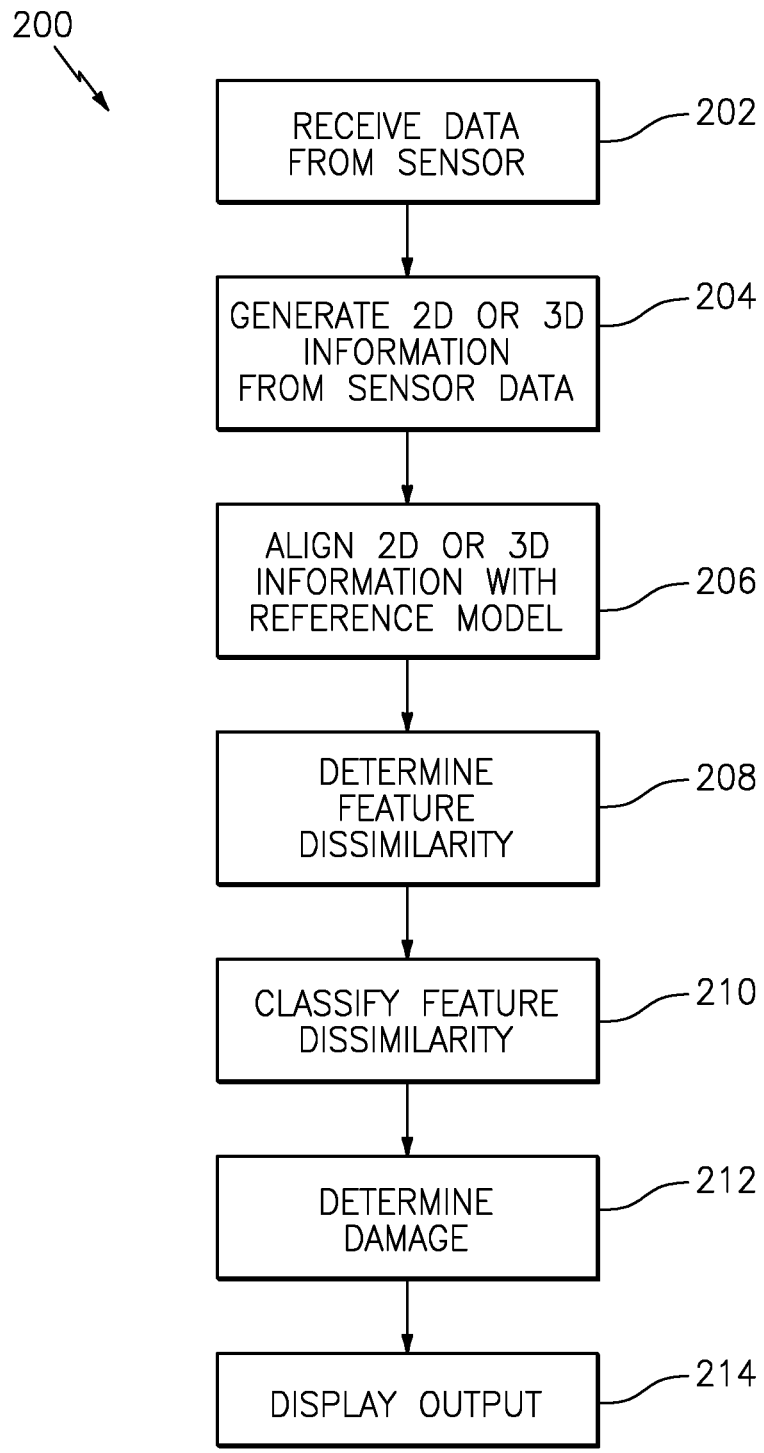
FIG. 2 is a process map of an exemplary fan blade inspection system in accordance with various embodiments.

With reference to FIG. 2, a method 200 for detecting defects is provided, in accordance with various embodiments. Processor 16 may be capable of carrying out the steps of FIG. 2. One or more sensors 12 may capture data about a component 20. Method 200, performed by processor 16 of damage detection system 10, may include receiving data from a sensor/camera (step 202). Method 200 may include generating 2D or 3D information from the sensor data (step 204). The 2D or 3D information may correspond to the component. Method 200 may include aligning the 2D or 3D information with a reference model (step 206), determining a feature dissimilarity between the 2D or 3D information and the reference model (step 208), classifying the feature dissimilarity (step 210), determining damage (step 212), and displaying an output (step 214).

Step 202 may further comprise receiving 1D, 2D, and/or 3D data from a sensor 12. In various embodiments, 3D information is received from one or more sensors 12, which may be 3D sensors. In receiving data 14 from a 3D sensor, the damage detection system 10 may capture depth points of component 20 and recreate precisely, the actual 3D surfaces of component 20, thereby generating a complete 3D point cloud or a partial 3D point cloud. In an exemplary embodiment, the entire forward surface of a gas turbine engine fan blade can be captured.

Step 204 may comprise producing a 3D point cloud or occupancy grid, a partial 3D point cloud, a model derived from a 3D point cloud, depth map, other depth information, 1D information, and/or 2D information. A 3D point cloud or occupancy grid may include a plurality of points or coordinates in a coordinate system having three dimensions, such as an xyz coordinate system or polar coordinate system. A partial 3D point cloud may include a plurality of points or coordinates in a 3D coordinate system, where the sensor data is collected from a single viewpoint or a limited set of viewpoints. A model derived from a 3D point cloud may include a modified 3D point cloud which has been processed to connect various points in the 3D point cloud in order to approximate or functionally estimate the topological surface of the component. A depth map may reflect points from a 3D point cloud that can be seen from a particular viewpoint. A depth map may be created by assuming a particular viewpoint of a 3D point cloud in the coordinate system of the 3D point cloud.

Step 204 may further comprise constructing a complete image or 3D point cloud of the component 20 by mosaicking or merging information from multiple sensors 12 or multiple viewpoints. Step 204 may comprise merging data 14 from multiple viewpoints. In various embodiments, step 204 may comprise merging a first data from a 1D sensor and a second data from a 2D sensor and processing the 1D and 2D data to produce 3D information 30.

In various embodiments, step 204 may comprise computing first data from a first 2D sensor and second data from a second 2D sensor. Processor 16 may receive a plurality of 2D sensor data and merge the 2D sensor data to generate a focal stack of 2D sensor data. The focal stack, i.e. multiple layers of 2D sensor data, may produce a volume of data to form the 3D information 30, which may be a 3D representation of the component.

Step 206 may further comprise aligning the 3D information, such as a 3D point cloud, by an iterative closest point (ICP) algorithm modified to suppress misalignment from damage areas of the component 20. The alignment may be performed by an optimization method, i.e., minimizing an objective function over a dataset, which may include mathematical terms in the ICP objective function or constraints to reject features or damage as outliers. The alignment may be performed by a 3D modification to a random sample consensus (RANSAC) algorithm, scale-invariant feature transform (SIFT), speeded up robust feature (SURF), or other suitable alignment method. Step 206 may further include comparing the 3D information 30 to the reference model 22 to align the features from the 3D information 30 with the reference model 22 by identifying affine and/or scale invariant features, diffeomorphic alignment/scale cascaded alignment, and the like. Step 206 may further include registering the features.

Step 208 may further comprise computing features, such as surface and shape characteristics, of the component 20 by methods to identify and extract features. For example, processor 16 may determine differences or dissimilarities between the 3D information 30 and the reference model 22. Step 208 may further comprise identifying features and determining differences or dissimilarities between the identified features in the 3D information 30 and the reference model 22 using a statistical algorithm such as a histogram of (oriented) gradients in 2D or 3D (HoG, HoOG, HoG3D, HoOG3D), 3D Zernike moments, or other algorithms. In a HoG3D method, processor 16 may define the orientation of edges and surfaces of 3D information 30 by dividing the 3D information 30 into portions or cells and assigning to each cell a value, where each point or pixel contributes a weighted orientation or gradient to the cell value. By grouping cells and normalizing the cell values, a histogram of the gradients can be produced and used to extract or estimate information about an edge or a surface of the component 20. Thus, the features of the 3D information 30, such as surface and edge shapes, may be identified. Other algorithms, such as 3D Zernike moments, may similarly be used to recognize features in 3D information 30 by using orthogonal moments to reconstruct, for example, surface and edge geometry of component 20. Step 208 may further comprise determining differences or dissimilarities between the identified features in the 3D information 30 and the reference model 22. The dissimilarities may be expressed, for example, by the distance between two points or vectors. Other approaches to expressing dissimilarities may include computing mathematical models of 3D information 30 and reference model 22 in a common basis (comprising modes) and expressing the dissimilarity as a difference of coefficients of the basis functions (modes). Differences or dissimilarities between the 3D information 30 and the reference model 22 may represent various types of damage to component 20.

Step 210 may further comprise classifying the feature dissimilarities identified in step 208. Damage detection system 10 may include categories of damage or defect types for component 20. For example, damage may be categorized into classes such as warping, stretching, edge defects, erosion, nicks, cracks, and/or cuts. Step 210 may further comprise identifying the damage type based on the dissimilarities between the 3D information 30 and the reference model 22. Step 210 may further comprise classifying the feature dissimilarities into categories of, for example, systemic damage or localized damage. Systemic damage may include warping or stretching of component 20. Localized damage may include edge defects, erosion, nicks, cracks, or cuts on a surface of component 20. Classifying the feature dissimilarities may be accomplished by, for example, support vector machine (SVM), decision tree, deep neural network, recurrent ensemble learning machine, or other classification method.

The detection of damage may include differencing the data and a model to produce an error map. The error map may contain small errors due to model-mismatch and sensing errors, and may contain large, spatially correlated errors where damage has occurred.

Step 212 may further comprise determining whether the feature difference or dissimilarity represents damage to component 20. Step 212 may comprise determining a probability of damage represented by the feature dissimilarity and/or classification. Step 212 may comprise determining damage by comparing the probability of damage to a threshold. Damage may be determined if the probability meets or exceeds a threshold. Damage detection system 10 may determine if the damage is acceptable or unacceptable, and may determine if the component 20 should be accepted or rejected, wherein a rejected component would indicate that the component should be repaired or replaced.

Various types of damage such as missing material, cracks, delamination, creep, spallation, and the like can be detected automatically by using a deep learning classifier trained from available data, such as a library of user characterized damage examples, by using statistical estimation algorithms, by image or video classification algorithms, and the like. Deep learning is the process of training or adjusting the weights of a deep neural network. In an embodiment the deep neural network is a deep convolutional neural network. Deep convolutional neural networks are trained by presenting an error map or partial error map to an input layer and, a damage/no-damage label (optionally, a descriptive label, e.g., missing material, crack, spallation, and the like), to an output layer. The training of a deep convolutional network proceeds layer-wise and does not require a label until the output layer is trained. The weights of the deep network's layers are adapted, typically by a stochastic gradient descent algorithm, to produce a correct classification. The deep learning training may use only partially labeled data, only fully labeled data, or only implicitly labeled data, or may use unlabeled data for initial or partial training with only a final training on labeled data.

In another embodiment statistical estimation or regression techniques to determine if damage is present in the error map. Statistical estimation regression techniques can include principal components analysis (PCA), robust PCA (RPCA), support vector machines (SVM), linear discriminant analysis (LDA), expectation maximization (EM), Boosting, Dictionary Matching, maximum likelihood (ML) estimation, maximum a priori (MAP) estimation, least squares (LS) estimation, non-linear LS (NNLS) estimation, and Bayesian Estimation based on the error map.

Step 214 may further comprise transmitting or displaying the 3D information, feature differences or dissimilarities, classification of the feature differences or dissimilarities, a damage report, and/or a determination or recommendation that the component 20 be accepted or rejected. Step 214 may further comprise displaying an image, a 3D model, a combined image and 3D model, a 2D perspective from a 3D model, and the like, of the damaged component for further evaluation by a user or by a subsequent automated system.

Figure 3:
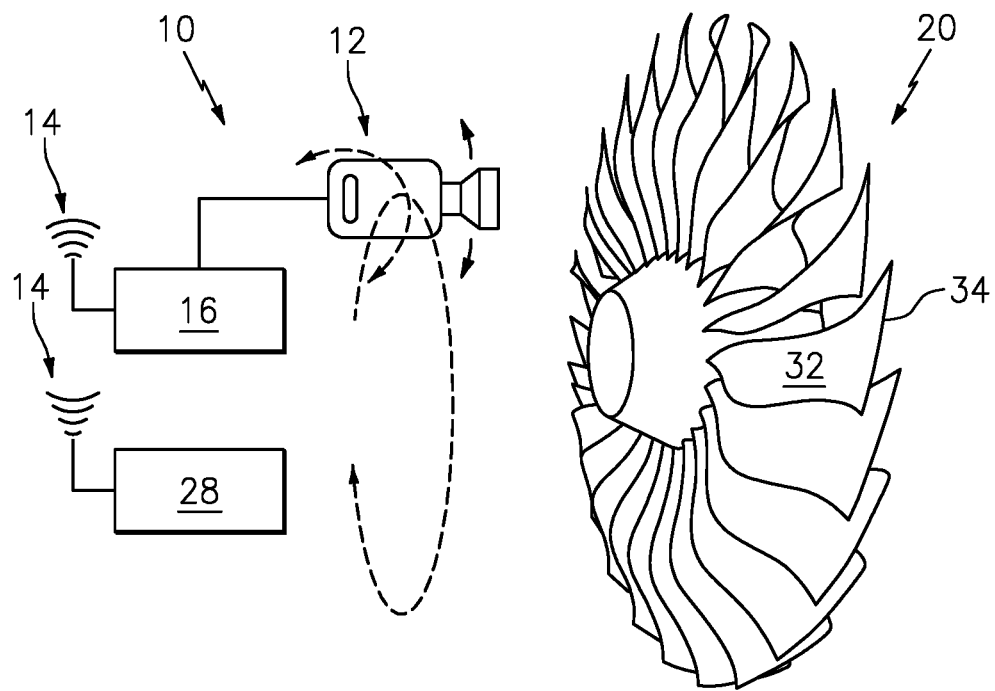
FIG. 3 is a schematic diagram of an exemplary fan blade inspection system.

Referring also to FIG. 3 an exemplary automated damage detection system 10 can be seen. FIG. 3 depicts an external, unattached inspection system. In this disclosure, the unattached inspection system depicted in FIG. 3 is considered to be in-situ. In another exemplary embodiment, the system 10 can include an optical in-situ, i.e., built-in, system for a gas turbine engine blade inspection. The component 20 can be a blade of a fan, a vane, a blade of a compressor, a vane of a compressor, a blade of a turbine, or a vane of a turbine. The exemplary embodiment shown in FIG. 3 includes a fan as the component 20. The sensor 12, is shown as a mobile video camera system 12 configured to capture video images of an entire forward surface 32 of at least one gas turbine engine blade 34. The camera 12 can be mobile (shown as arrows), such that the camera can move, pan, slide or otherwise reposition to capture the necessary image data 14 of the entire forward surface 32. The mobile video camera system 12 can be moved through location and pose variation to image the entire forward surface 32 of each of the blades 34 of the gas turbine engine 38. The imaging of the blade 34 of the gas turbine engine 38 can be done either continuously or intermittently. In another exemplary embodiment, the imaging is conducted during gas turbine engine operational conditions such as coasting, spool-up, and spool-down, including at least one complete revolution.

The processor 16 may be coupled to the mobile video camera (system) 12. The processor 16 can be configured to determine damage to the gas turbine engine blade 34 based on video analytics. The processor 16 is shown with a transceiver configured to communicate wirelessly with the user interface 28. In another exemplary embodiment the system can be hard wired. The processor 16 can be configured to automatically report damage and archive the damage for trending and condition-based-maintenance.

Figure 4:
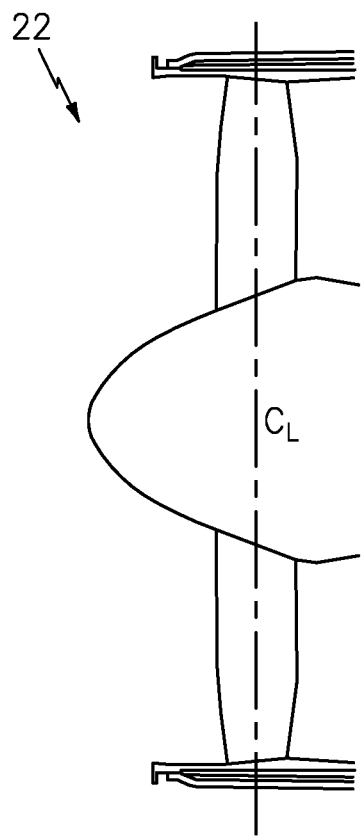
FIG. 4 illustrates an exemplary fan with a fan blade plane (centerline in side view).

The processor 16 can be configured to receive the data for the entire forward surface of the gas turbine engine from the video camera system 12. The processor 16 can synthesize the entire forward surface view using a simultaneous localization and mapping (SLAM) process, structure from motion process, and the like program as described elsewhere herein. The processor 16 can include a model registration process based on blade plane determination as shown in FIG. 4. The blade plane may be determined by mathematically fitting a flat 2-dimensional plane to all, or a subset, of the data 14. In one embodiment, a subset of data comprising the most radially extreme data points (indicative of the blade tips) is used in the plane fitting. The plane may be fit by standard linear regression. The blade plane may be used for damage detection (e.g., for position of the blades with respect to the plane), for an initial orientation for registration of a single blade model, and the like.

Figure 5:
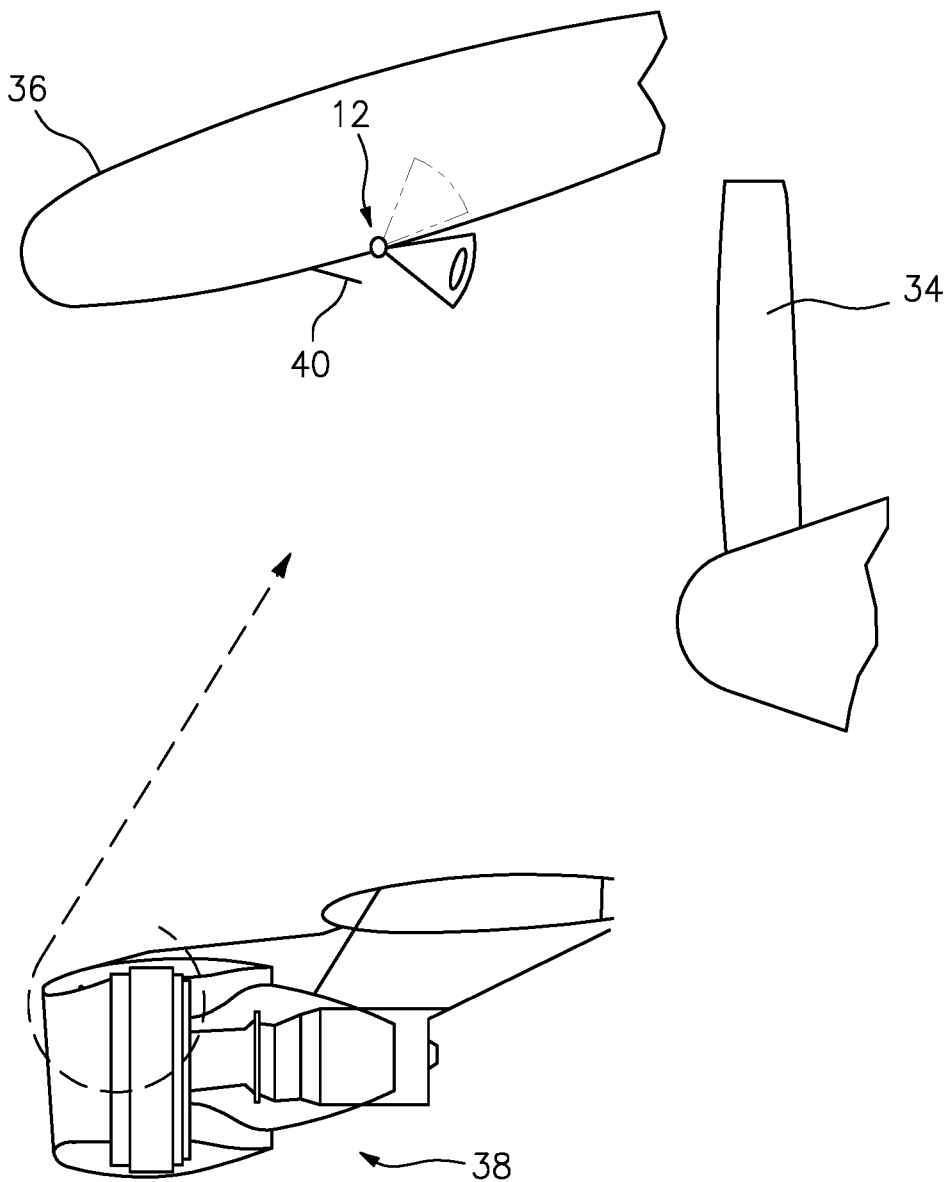
FIG. 5 is a schematic diagram of the exemplary fan blade inspection system in-situ.

Referring also to FIG. 5, the sensor 12 is configured as a mobile camera integral with and coupled to a nacelle 36 of a gas turbine engine 38. In another exemplary embodiment, the camera 12 can be coupled to an engine washing system (not shown). In this disclosure, the camera 12 coupled to an engine washing system is considered to be in-situ. In an exemplary embodiment, the mobile video camera system 12 can include lighting within a visible spectrum and/or an infrared spectrum. In another exemplary embodiment, the mobile video camera system 12 can include a shroud 40 configured to protect the mobile video camera system 12 from impact damage and debris entering the engine 38. In another exemplary embodiment, the mobile video camera system 12 can retract into a protected position away from exposure to debris. In yet another embodiment, video camera system 12 may be mounted substantially flush with an inner surface of a gas turbine engine, or the like, or be mounted behind a protective window which is substantially flush with the inner surface. In these embodiments, video camera 12 may require special design for high-temperature operation such as special cooling, additional relay optics, high-temperature fiber-optic light guides, and the like.

There has been provided an automated optical inspection system. While the automated optical inspection system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An in-situ system for a gas turbine engine blade inspection comprising:
    a sensor system configured to capture images of a forward surface of at least one gas turbine engine blade;
    a processor coupled to said sensor system, said processor configured to determine damage to said at least one gas turbine engine blade based on video analytics; and
    a tangible, non-transitory memory configured to communicate with said processor, the tangible, non-transitory memory having instructions stored therein that, in response to execution by the processor, cause the processor to perform operations comprising:
    receiving, by the processor, data for said forward surface of at least one gas turbine engine blade from said sensor system;
    aligning, by the processor, the data with a reference model;
    determining, by the processor, a feature dissimilarity between the data and the reference model;
    classifying, by the processor, the feature dissimilarity; and
    determining, by the processor, a probability that the feature dissimilarity indicates damage to the blade.

2. The in-situ system for gas turbine engine blade inspection of claim 1, wherein said processor further comprises at least one of a simultaneous localization and mapping process and a structure from motion process program.

3. The in-situ system for gas turbine engine blade inspection of claim 1, wherein said processor further comprises a model registration process based on blade plane determination.

4. The in-situ system for gas turbine engine blade inspection of claim 1, wherein said processor further comprises a mosaicking program and a damage detection video analytics program.

5. The in-situ system for gas turbine engine blade inspection of claim 1, wherein said sensor system is integral with at least one of an engine nacelle and an engine washing system.

6. The in-situ system for gas turbine engine blade inspection of claim 1, wherein said sensor system comprises lighting comprising at least one of a visible spectrum and an infrared spectrum.

7. The in-situ system for gas turbine engine blade inspection of claim 1, wherein said sensor system further comprises a shroud configured to protect said sensor from impact damage and debris.

8. The in-situ system for gas turbine engine blade inspection of claim 1, wherein said gas turbine engine blade is selected from the group consisting of a fan blade, a vane, a compressor blade, a compressor vane, a turbine blade, and a turbine vane.

9. The in-situ system for gas turbine engine blade inspection of claim 1, wherein said processor is configured to at least one of automatically report damage and archive said damage for at least one of trending and condition-based-maintenance.

10. A method for in-situ inspection of a gas turbine engine blade, comprising:
positioning a sensor to capture images of a forward surface of at least one gas turbine engine blade;
coupling a processor to said sensor, said processor configured to determine damage to said at least one gas turbine engine blade based on image analytics;
wherein said processor performs operations comprising:
receiving, by the processor, data for said forward surface of at least one gas turbine engine blade from said sensor;
aligning, by the processor, the data with a reference model;
determining, by the processor, a feature dissimilarity between the data and the reference model;
classifying, by the processor, the feature dissimilarity; and
determining, by the processor, a probability that the feature dissimilarity indicates damage to the blade.

11. The method for in-situ inspection of a gas turbine engine blade of claim 10, further comprising: moving said sensor through location and pose variation to image said forward surface of each of said at least one blade of said gas turbine engine.

12. The method for in-situ inspection of a gas turbine engine blade of claim 11, further comprising:
mosaicking said forward surface of each of said at least one blade of said gas turbine engine into a 3D current condition estimate.

13. The method for in-situ inspection of a gas turbine engine blade of claim 12, wherein said mosaicking further comprises:
utilizing a simultaneous localization and mapping process.

14. The method for in-situ inspection of a gas turbine engine blade of claim 13 further comprising:
estimating a plane of each of said at least one blade of said gas turbine engine based on said data and said reference model; and
utilizing rotation as a variable.

15. The method for in-situ inspection of a gas turbine engine blade of claim 10 further comprising: archiving said data and said feature dissimilarity for future damage progression detection, damage trending and condition-based maintenance.

16. The method for in-situ inspection of a gas turbine engine blade of claim 10 further comprising: imaging said at least one blade of said gas turbine engine one of continuously and intermittently.

17. The method for in-situ inspection of a gas turbine engine blade of claim 10 wherein said imaging is conducted during gas turbine engine operational conditions selected from the group consisting of coasting, spool-up, and spool-down, including at least one complete revolution.

18. The method for in-situ inspection of a gas turbine engine blade of claim 10 wherein said sensor comprises at least one of, multiple sensors, a video camera, and a depth sensor.

19. The method for in-situ inspection of a gas turbine engine blade of claim 10 wherein said sensor is configured to retract away from exposure to debris.

* * * * *